United States Patent
Chen et al.

(10) Patent No.: US 11,657,135 B2
(45) Date of Patent: May 23, 2023

(54) METHOD FOR UNLOCKING DISPLAY PANEL AND DISPLAY ASSEMBLY

(71) Applicants: Fuzhou BOE Optoelectronics Technology Co., Ltd., Fujian (CN); BOE Technology Group Co., Ltd., Beijing (CN)

(72) Inventors: Jinfeng Chen, Beijing (CN); Yifeng Su, Beijing (CN); Weiming Yu, Beijing (CN); Xiaoli Kong, Beijing (CN); Xuening Zhao, Beijing (CN); Wenjian Yao, Beijing (CN); Hongjiang Wu, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

(*) Notice: Subject to any disclaimer, the term of this patent is extended or adjusted under 35 U.S.C. 154(b) by 105 days.

(21) Appl. No.: 16/945,232

(22) Filed: Jul. 31, 2020

(65) Prior Publication Data

US 2021/0049257 A1 Feb. 18, 2021

(30) Foreign Application Priority Data

Aug. 15, 2019 (CN) .......................... 201910754546.9

(51) Int. Cl.
*G06F 21/36* (2013.01)
*G06F 3/0482* (2013.01)
(Continued)

(52) U.S. Cl.
CPC ............ *G06F 21/36* (2013.01); *G06F 3/0482* (2013.01); *G06F 3/04883* (2013.01); *G06F 7/22* (2013.01);
(Continued)

(58) Field of Classification Search
CPC ........ G06F 7/22; G06F 21/36; G06F 3/04883; G06F 2221/2149; G06F 21/84; G06F 21/40
See application file for complete search history.

(56) References Cited

U.S. PATENT DOCUMENTS 8,850,519 B2 * 9/2014 Osborn .................. G06F 21/36
                                                      726/2
2012/0204258 A1    8/2012 Lee
(Continued)

FOREIGN PATENT DOCUMENTS

CN    105893832 A    8/2016
CN    106295304 A    1/2017
(Continued)

OTHER PUBLICATIONS

Chinese First Office Action dated Oct. 28, 2020 corresponding to application No. 201910754546.9.

*Primary Examiner* — Andrea C Leggett
(74) *Attorney, Agent, or Firm* — Nath, Goldberg & Meyer; Joshua B. Goldberg

(57) ABSTRACT

A method for unlocking a display panel and a display assembly are provided. The method includes: acquiring a plurality of preset pictures, wherein different preset pictures among the plurality of preset pictures correspond to different preset inputs; performing at least one unlocking process, wherein each of the at least one unlocking process includes: causing the display panel to display at least one preset picture of the plurality of preset pictures and receive a verification input from a user, when the display panel is in a locked state; determining whether the verification input is identical with the preset input corresponding to a displayed preset picture; and switching the display panel to an unlocked state, if the verification input is identical with the preset input corresponding to the displayed preset picture.

20 Claims, 6 Drawing Sheets

(51) Int. Cl.
    *G06F 3/04883*     (2022.01)
    *G06F 7/22*     (2006.01)
    *G06F 21/40*     (2013.01)
    *G06F 21/84*     (2013.01)

(52) U.S. Cl.
    CPC .............. *G06F 21/40* (2013.01); *G06F 21/84* (2013.01); *G06F 2221/2149* (2013.01)

(56) References Cited

U.S. PATENT DOCUMENTS

| | | | | |
|---|---|---|---|---|
| 2013/0094770 A1* | 4/2013 | Lee | ......................... | G06F 21/36 |
| | | | | 345/173 |
| 2014/0298268 A1* | 10/2014 | Kang | .................. | G06F 3/04847 |
| | | | | 715/841 |
| 2015/0067829 A1* | 3/2015 | Liu | ....................... | G06F 3/0482 |
| | | | | 726/19 |
| 2015/0113597 A1* | 4/2015 | Snelling | ................. | G06Q 30/02 |
| | | | | 726/3 |
| 2015/0135291 A1* | 5/2015 | Yang | ..................... | H04L 63/083 |
| | | | | 726/6 |
| 2016/0248864 A1* | 8/2016 | Loia | ....................... | G06Q 50/01 |
| 2019/0080871 A1* | 3/2019 | Jeong | ...................... | H01J 9/42 |

FOREIGN PATENT DOCUMENTS

| | | |
|---|---|---|
| CN | 107153785 A | 9/2017 |
| CN | 109670282 A | 4/2019 |

\* cited by examiner

METHOD FOR UNLOCKING DISPLAY PANEL AND DISPLAY ASSEMBLY

CROSS REFERENCE TO RELATED APPLICATIONS

This application claims the priority of Chinese patent application No. 201910754546.9, filed on Aug. 15, 2019, the content of which is incorporated herein in its entirety by reference.

TECHNICAL FIELD

The present disclosure belongs to the field of display technologies, and in particular, to a method for unlocking a display panel and a display assembly.

BACKGROUND

To ensure the security of information of a user, an existing electronic terminal (e.g., a smart phone, a personal computer, etc.) is provided with a locking-unlocking unit for a display panel of the electronic terminal.

SUMMARY

Embodiments of the present disclosure provide a method for unlocking a display panel and a display assembly.

A first aspect of the present disclosure provides a method for unlocking a display panel, the method including:

acquiring a plurality of preset pictures, wherein different preset pictures among the plurality of preset pictures correspond to different preset inputs;

performing at least one unlocking process, wherein each of the at least one unlocking process includes:

causing the display panel to display at least one preset picture of the plurality of preset pictures and receive a verification input from a user, when the display panel is in a locked state;

determining whether the verification input is identical with the preset input corresponding to a displayed preset picture; and switching the display panel to an unlocked state, if the verification input is identical with the preset input corresponding to the displayed preset picture.

In an embodiment, the causing the display panel to display at least one preset picture of the plurality of preset pictures and receive a verification input from a user, when the display panel is in a locked state includes: causing the display panel to sequentially display at least one part of the preset pictures among the plurality of preset pictures, and sequentially receive verification inputs from the user, wherein the verification inputs are in one-to-one correspondence with the at least one part of the preset pictures; and the determining whether the verification input is identical with the preset input corresponding to a displayed preset picture includes: determining whether the verification inputs are identical with the preset inputs corresponding to the at least one part of the preset picture according to a display order of the at least one part of the preset picture.

In an embodiment, the causing the display panel to display at least one preset picture of the plurality of preset pictures and receive a verification input from a user, when the display panel is in a locked state, and the determining whether the verification input is identical with the preset input corresponding to a displayed preset picture include:

causing the display panel to display a first picture, wherein the first picture is a picture of the plurality of preset pictures;

receiving a first verification input from the user;

determining whether the first verification input is identical with the preset input corresponding to the first picture;

after determining whether the first verification input is identical with the preset input corresponding to the first picture, causing the display panel to display a second picture, wherein the second picture is a picture of the plurality of preset pictures;

receiving a second verification input from the user;

determining whether the second verification input is identical with the preset input corresponding to the second picture; and switching the display panel to the unlocked state, if the first verification input is identical with the preset input corresponding to the first picture and the second verification input is identical with the preset input corresponding to the second picture.

In an embodiment, the performing at least one unlocking process includes:

performing a plurality of unlocking processes, and in different unlocking processes among the plurality of unlocking processes, causing the display panel to display at least two preset pictures among the plurality of preset pictures and display the at least two preset pictures in a same order.

In an embodiment, the performing at least one unlocking process includes:

performing a plurality of unlocking processes, and in different unlocking processes among the plurality of unlocking processes, causing the display panel to display different parts of preset pictures among the plurality of preset pictures, or display a same part of preset pictures among the plurality of preset pictures in different orders.

In an embodiment, the acquiring a plurality of preset pictures includes: arranging the plurality of preset pictures into a closed loop according to a preset order; and in different unlocking processes among the plurality of unlocking processes, a start preset picture displayed in a current unlocking process is adjacent, in a clockwise direction or a counterclockwise direction of the closed loop, to an end preset picture displayed in an immediately previous unlocking process.

In an embodiment, the acquiring a plurality of preset pictures, wherein different preset pictures among the plurality of preset pictures correspond to different preset inputs includes:

each of the plurality of preset pictures corresponding to one preset input.

In an embodiment, the acquiring a plurality of preset pictures, wherein different preset pictures among the plurality of preset pictures correspond to different preset inputs includes:

each of the plurality of preset pictures including a plurality of regions, and different regions among the plurality of regions corresponding to different preset inputs, respectively.

In an embodiment, each of the preset inputs is an initial password for locking the display panel, and the initial password includes any one of a character, an action, and an empty password.

In an embodiment, the second picture is different from the first picture.

A second aspect of the present disclosure provides a display assembly, including:

a display panel; and an unlocking unit configured to perform the following operations:

acquiring a plurality of preset pictures, wherein different preset pictures among the plurality of preset pictures correspond to different preset inputs;

performing at least one unlocking process, wherein each of the at least one unlocking process includes:

causing the display panel to display at least one preset picture of the plurality of preset pictures and receive a verification input from a user, when the display panel is in a locked state;

determining whether the verification input is identical with the preset input corresponding to a displayed preset picture; and switching the display panel to an unlocked state, if the verification input is identical with the preset input corresponding to the displayed preset picture.

In an embodiment, the unlocking unit is further configured to perform the following operations:

causing the display panel to sequentially display at least one part of the preset pictures among the plurality of preset pictures, and sequentially receive verification inputs from the user, wherein the verification inputs are in one-to-one correspondence with the at least one part of the preset pictures; and determining whether the verification inputs are identical with the preset inputs corresponding to the at least one part of the preset picture according to a display order of the at least one part of the preset picture.

In an embodiment, the unlocking unit is further configured to perform the following operations:

causing the display panel to display a first picture, wherein the first picture is a picture of the plurality of preset pictures;

receiving a first verification input from the user;

determining whether the first verification input is identical with the preset input corresponding to the first picture;

after determining whether the first verification input is identical with the preset input corresponding to the first picture, causing the display panel to display a second picture, wherein the second picture is a picture of the plurality of preset pictures;

receiving a second verification input from the user;

determining whether the second verification input is identical with the preset input corresponding to the second picture; and switching the display panel to the unlocked state, if the first verification input is identical with the preset input corresponding to the first picture and the second verification input is identical with the preset input corresponding to the second picture.

In an embodiment, the unlocking unit is further configured to perform the following operations:

performing a plurality of unlocking processes, and in different unlocking processes among the plurality of unlocking processes, causing the display panel to display at least two preset pictures among the plurality of preset pictures and display the at least two preset pictures in a same order.

In an embodiment, the unlocking unit is further configured to perform the following operations:

performing a plurality of unlocking processes, and in different unlocking processes among the plurality of unlocking processes, causing the display panel to display different parts of preset pictures among the plurality of preset pictures, or display a same part of preset pictures among the plurality of preset pictures in different orders.

In an embodiment, the unlocking unit is further configured to perform the following operations:

arranging the plurality of preset pictures into a closed loop according to a preset order; and in different unlocking processes among the plurality of unlocking processes, determining a start preset picture displayed in a current unlocking process to be adjacent, in a clockwise direction or a counterclockwise direction of the closed loop, to an end preset picture displayed in an immediately previous unlocking process.

In an embodiment, the unlocking unit is further configured to perform the following operation:

setting one preset input for each of the plurality of preset pictures.

In an embodiment, the unlocking unit is further configured to perform the following operation:

in a case where each of the plurality of preset pictures includes a plurality of regions, setting different preset inputs for different regions among the plurality of regions, respectively.

In an embodiment, the unlocking unit is further configured to perform the following operations:

setting each of the preset inputs as an initial password for locking the display panel, and setting the initial password to include any one of a character, an action, and an empty password.

In an embodiment, the display panel is a touch display panel.

BRIEF DESCRIPTION OF THE DRAWINGS

The accompanying drawings, which are provided for further understanding of the present disclosure and constitute a part of this specification, explain the present disclosure together with the following exemplary embodiments, but are not intended to limit the present disclosure. In the drawings.

DETAILED DESCRIPTION

To enable one of ordinary skill in the art better understand technical solutions of the present disclosure, the present disclosure will be further described below in detail with reference to the accompanying drawings and exemplary embodiments.

The inventors of the present inventive concept have found that, a locking-unlocking unit of a display panel of an existing electronic terminal can only set a fixed password according to a key and lock the display panel by using the fixed password. Thereafter, a user of the electronic terminal can unlock the display panel of the electronic terminal only with the fixed password. The fixed password is easily acquired by using an input trace of a background program of the electronic terminal or other methods, such that locking (or encryption) safety of the display panel is low.

In order to solve at least the problem that the locking (or encryption) safety of the existing display panel is low, embodiments of the present disclosure provide a method for unlocking a display panel and a display assembly that have high locking (or encryption) safety.

As shown in FIGS. 1 to 4, an embodiment of the present disclosure provides a method for unlocking a display panel, and the method may include the following steps S11 and S12.

In step S11, a plurality of preset pictures are acquired, wherein different ones of the plurality of preset pictures correspond to different preset inputs (i.e., initial passwords, which are used for locking a display panel).

Figure 5:
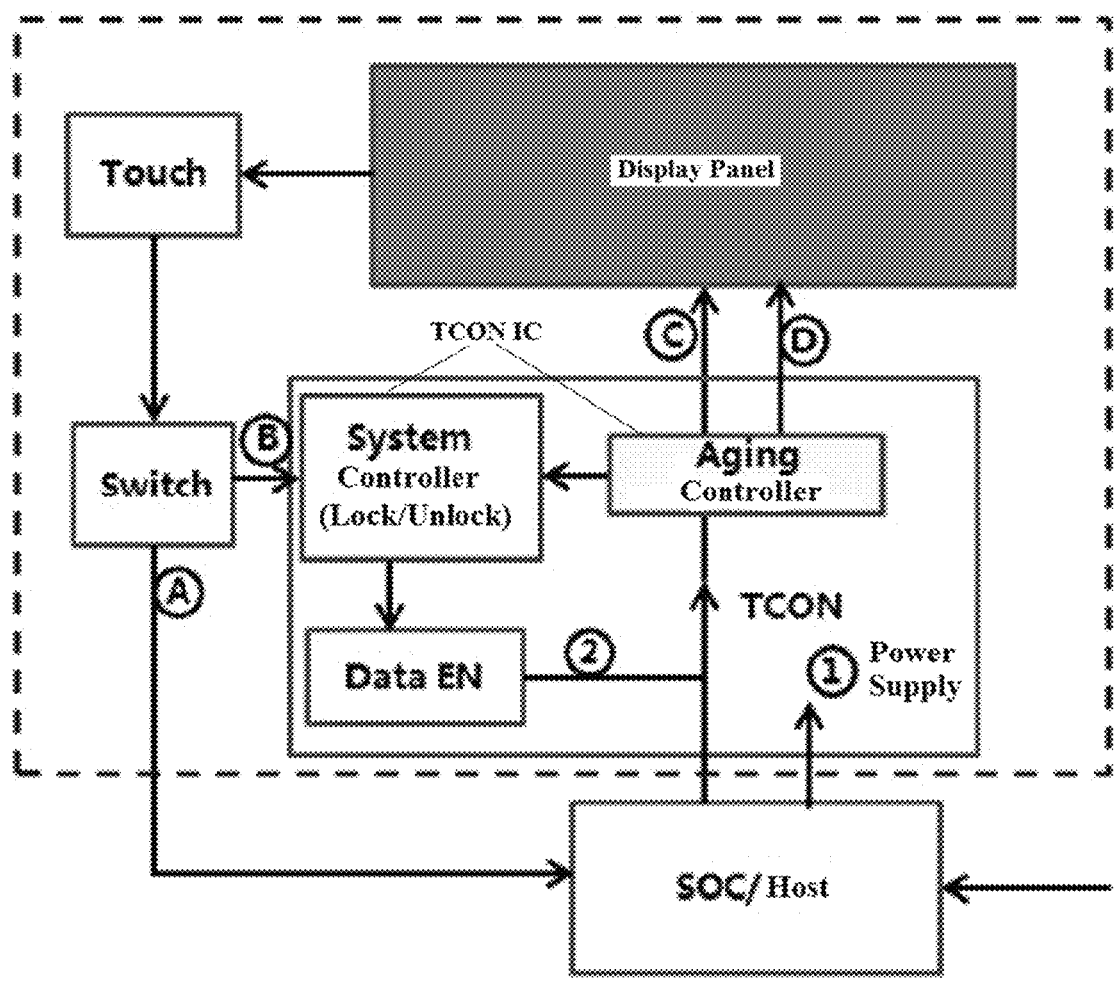
FIG. 5 is a schematic diagram showing a structure of a display assembly (i.e., the portion in the dashed-line box) and a flowchart of the method for unlocking a display panel as shown in FIG. 1 or 2 performed by the display assembly, according to an embodiment of the present disclosure.
Figure 6:
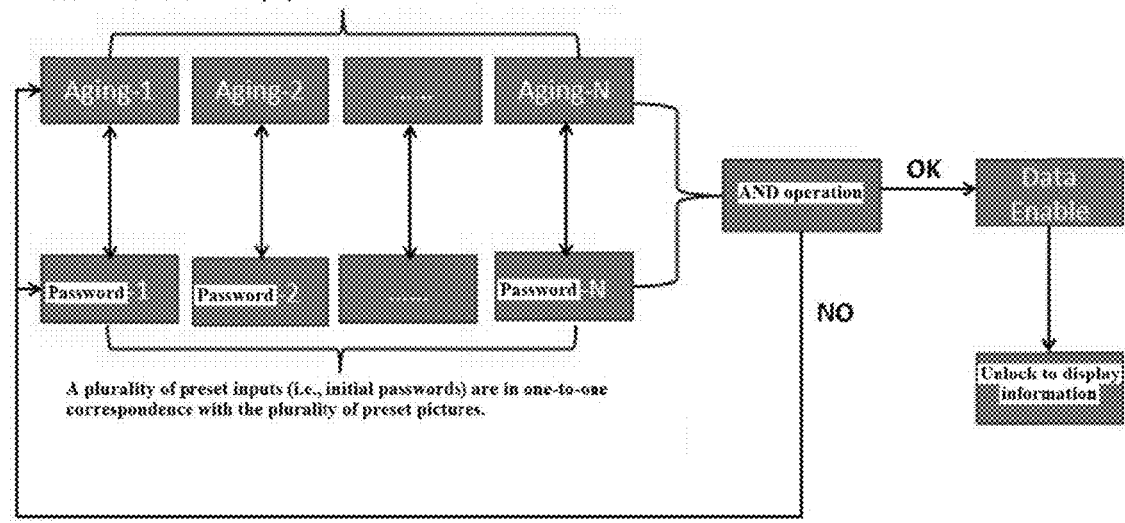
FIG. 6 is a schematic diagram showing a flowchart of a method for unlocking a display panel and an example in which a plurality of preset pictures are in one-to-one correspondence with a plurality of preset inputs (i.e., initial passwords), according to an embodiment of the present disclosure.

As shown in FIG. 5, each display panel generally includes a timing controller (which may be referred to as "TCON") including a panel driving circuit (which may be referred to as "TCON IC") for driving a display panel. Further, the TCON IC includes an aging controller and a system controller, and a combination of the aging controller and the system controller may have a function of storing (e.g., in a memory) a plurality of preset pictures and initial passwords (which are also referred to as "preset inputs" in the present disclosure) in one-to-one correspondence with the plurality of preset pictures, a protection function for power-on self-test failure, a function of detecting heating aging, and the like. Each of the initial passwords may be used for locking the display panel. For example, an entity performing a method for unlocking a display panel may be the panel driving circuit (i.e., the TCON IC) that is also for controlling a display function of the display panel. Acquiring a plurality of preset pictures may mean storing the plurality of preset pictures in the aging controller of the TCON IC in advance, and each of the plurality of preset pictures may have a corresponding preset input (i.e., a corresponding initial password), so as to implement an unlocking process subsequently. In an embodiment, a preset input (i.e., an initial password) may be set for each preset picture when the display panel is powered on, or a "switch" button (as shown in FIG. 5) may be displayed on the display panel after the display panel having a touch function is powered on, and when a user touches the switch button, an interface for setting a preset input (i.e., an initial password) for each preset picture may be entered. In an embodiment, as shown in FIG. 6, the plurality of preset pictures may include pictures Aging-1 to Aging-N, and preset inputs (i.e., initial passwords) Password-1 to Password-N may be set for the plurality of preset pictures, respectively, where N is a positive integer greater than or equal to 1.

In step S12, at least one unlocking process is performed, wherein each of the at least one unlocking process may include the following steps S121 to S123.

In step S121, when the display panel is in a locked state, the display panel is caused to display at least one preset picture and receive a verification input (i.e., an unlocking password) from a user.

That is, the user inputs the verification input according to the preset picture displayed on the display panel to achieve unlocking of the display panel.

In step S122, it is determined whether the verification input is identical with (i.e., the same as) the preset input corresponding to the displayed preset picture.

In step S123, if the verification input is identical with the preset input corresponding to the displayed preset picture, the display panel is switched to an unlocked state.

For example, in step S122, for each preset picture, the TCON IC may represent and record a determination result as logical value "1" in the memory if it is determined that the verification input is identical with the preset input corresponding to the displayed preset picture, and represent and record the determination result as logical value "0" in the memory if it is determined that the verification input is not identical with the preset input corresponding to the displayed preset picture. In step S123, for all of displayed preset pictures, the verification input being identical with the preset input corresponding to the displayed preset picture may mean that the TCON IC performs a logical AND operation on the determination results of all of the displayed preset pictures, and outputs a data enable signal (Data Enable) to switch the display panel to the unlocked state if the result of the AND operation is a logical value "1" (i.e., "OK" shown in FIG. 6). Further, in a case where the result of the AND operation is a logic value "0" (i.e., "NO" shown in FIG. 6), the display panel may be controlled to display a plurality of preset pictures to authenticate the user again, and/or be controlled to remain in the locked state.

Figure 4:
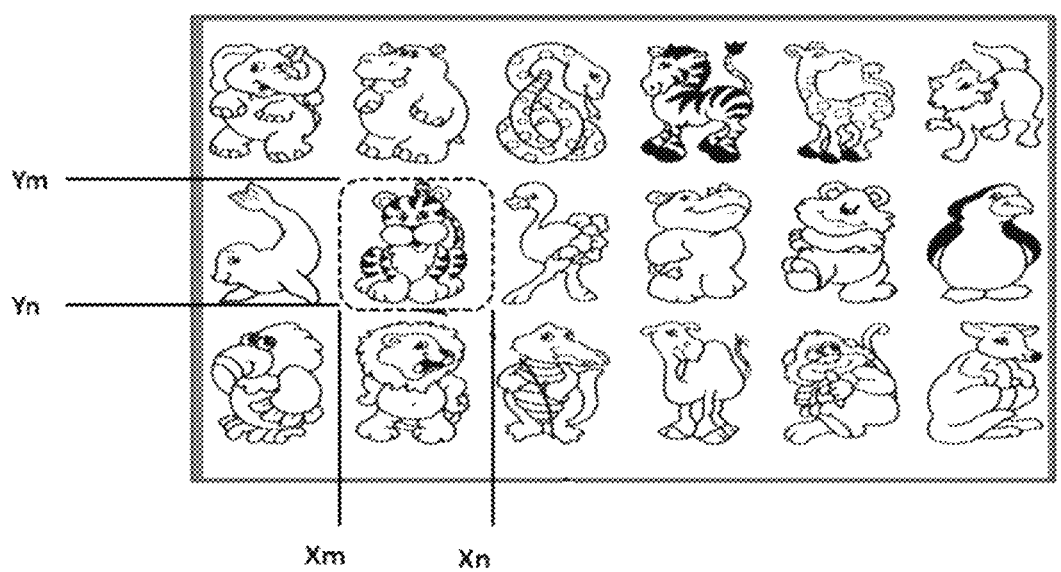
FIG. 4 is a schematic diagram of a preset picture according to an embodiment of the present disclosure.
Figure 7:
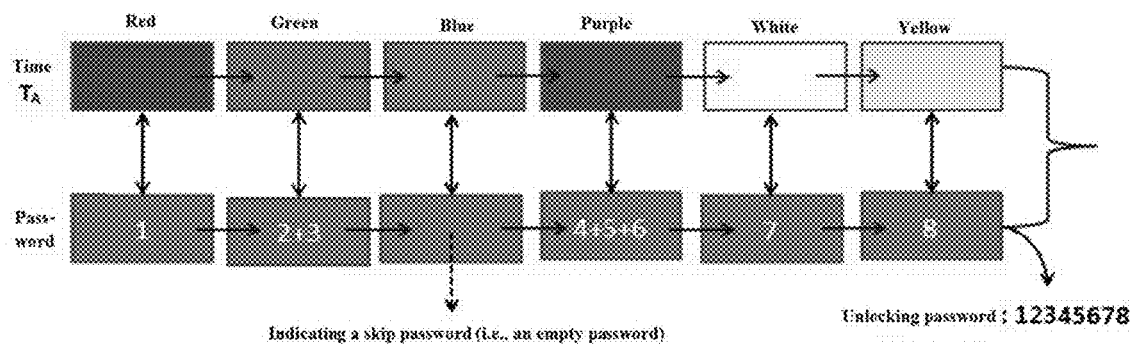
FIG. 7 is a schematic diagram showing a display order of a plurality of preset pictures in an unlocking process and an unlocking password (i.e., a verification input capable of unlocking a display panel that has been in a locked state) corresponding to the display order of the plurality of preset pictures, according to an embodiment of the present disclosure.
Figure 8:
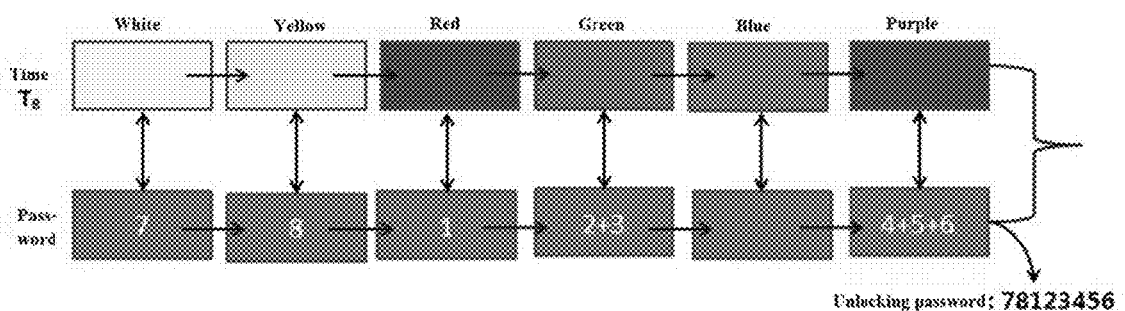
FIG. 8 is a schematic diagram showing a display order of a plurality of preset pictures in another unlocking process and an unlocking password corresponding to the display order of the plurality of preset pictures, according to an embodiment of the present disclosure.
Figure 9:
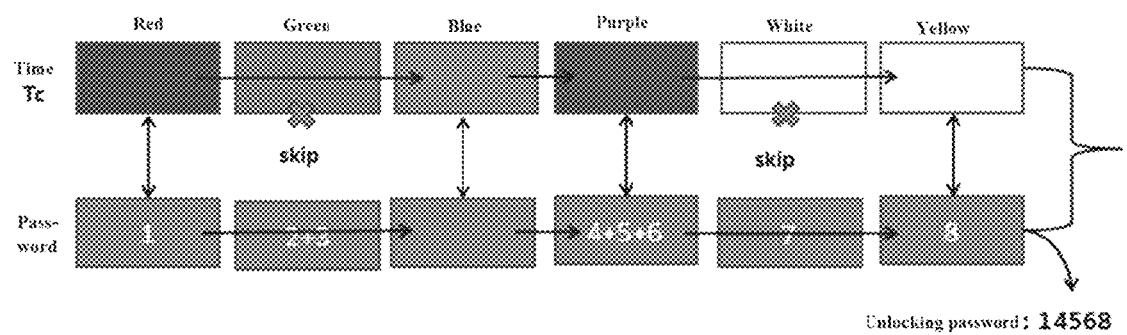
FIG. 9 is a schematic diagram showing a display order of a part of preset pictures among a plurality of preset pictures displayed by a display panel in an unlocking process and an unlocking password corresponding to the display order of the part of preset pictures, according to an embodiment of the present disclosure.

In an embodiment, each of the plurality of preset pictures may be a black-and-white or color picture as shown in FIG. 4, a monochromatic picture as shown in FIGS. 7 to 9, or the like. For example, six pictures of red, green, blue, purple, white, and yellow may be selected as the plurality of preset pictures (which may be referred to as aging pictures), and the display panel sequentially displays the pictures according to the above listed order of the pictures during an unlocking process. Further, the preset inputs (i.e., the initial passwords) corresponding to the pictures may be: "1" for the red picture, "23" for the green picture, a skip password for the blue picture, "456" for the purple picture, "7" for the white picture, and "8" for the yellow picture. The display panel will be switched to the unlocked state when the verification inputs are "12345678" as shown in FIG. 7.

For another example, three pictures of red, green, and blue may be selected as the plurality of preset pictures (which may be referred to as imaging pictures), and the display panel sequentially displays the pictures according to the above listed order of the pictures in an unlocking process. Further, the preset inputs corresponding to the pictures may be: a first action (e.g., drawing a horizontal line on the display panel) for the red picture, a second action (e.g., drawing a diagonal line on the display panel) for the green picture, and a third action (e.g., drawing a vertical line on the display panel) for the blue picture. When the verification inputs are the first action, the second action and the third action in sequence, the display panel is switched to the unlocked state.

The process of steps S121 to S123 may represent one unlocking process, and each unlocking process may include the above steps S121 to S123. Further, since there is the at least one preset pictures, the displayed preset pictures and the display orders of the displayed preset pictures in different unlocking processes may be different from each other, and the corresponding verification inputs should be different from each other, such that dynamic unlocking of the display panel is realized.

As shown in FIG. 5, the display panel may be connected to a system-on-chip (SOC), a host, etc. In addition, a flow of the method for unlocking the display panel may be as follows: the display panel is powered on to supply power to the TCON (as shown in step ① in FIG. 5)→the TCON IC starts displaying of the aging pictures (as shown in step Ⓓ in FIG. 5)→the "Switch" button on the display panel is touched to switch the display panel to a password input mode (as shown in step @ in FIG. 5)→the system controller of the TCON IC performs the AND operation on determination results (or comparison results) of the displayed preset pictures and the corresponding verification inputs→the corresponding verification inputs are identical with the respective preset inputs→(i.e., the AND operation results in a logical value "1")→turn on the Data Enable mode of the display panel (as shown in step ② in FIG. 5)→the display panel is unlocked and switched to a data display mode (as shown in step Ⓒ in FIG. 5), and the touch function of the display panel is switched to the conventional touch function (as shown in step Ⓐ in FIG. 5). It should be understood that, the "Touch" unit shown in FIG. 5 may denote a touch panel provided on a light exit surface of the display panel.

In the method for unlocking a display panel according to the present embodiment, a plurality of preset pictures may be provided, and different preset pictures correspond to different preset inputs, such that displaying of different preset pictures requires different verification inputs to unlock the display panel, and thus a dynamic password (i.e., a non-fixed password) is needed for unlocking the display panel. Even if the preset input corresponding to each preset picture or a verification input in the current unlocking process may be acquired through the input trace of a background program or through other methods, a verification input during a next unlocking process cannot be acquired because the preset pictures to be displayed and the display order of the displayed preset pictures are unknown in the next unlocking process, thereby realizing the safe dynamic unlocking of the display panel. Compared with the unlocking of the display panel by using a fixed password in the prior art, the encryption (or locked) safety of the display panel can be improved, such that illegal unlocking of the display panel by using input traces of a background program or other methods can be avoided.

As shown in FIGS. 1 to 4, an embodiment of the present disclosure provides another method for unlocking a display panel, and the method may include the following steps S21 and S22.

In step S21, a plurality of preset pictures are acquired, wherein different ones of the plurality of preset pictures correspond to different preset inputs.

As described above, an entity performing the method for unlocking a display panel may be the panel driving circuit (i.e., the TCON IC) that is also for controlling a display function of the display panel, and the TCON IC includes the aging controller and the system controller. Acquiring a plurality of preset pictures may mean storing the plurality of preset pictures in the aging controller (which may include a memory or be connected to a memory located in the display panel) of the TCON IC, and each of the preset pictures may have a corresponding preset input, so as to implement an unlocking process subsequently.

In an embodiment, each of the preset inputs may include: any one of a character, an action, and no input (i.e., a skip password).

For example, the character may include a numeral, a letter, a punctuation mark, a combination of the numeral, the letter, and the punctuation marks, or the like.

In an embodiment, each of the preset pictures may correspond to one preset input.

That is, the preset input (i.e., the initial password) of each of the preset pictures may be at least one numeral, at least one letter, at least one punctuation mark, at least one combination of the numeral, the letter, the punctuation mark, or the like.

In an embodiment, each of the preset pictures may include a plurality of regions, and different ones of the plurality of regions may correspond to different preset inputs. For example, the picture shown in FIG. 4 may include a plurality of regions, each of the plurality of regions represents an animal. The plurality of regions have preset inputs (i.e., initial passwords), respectively. The display panel may display at least one of the plurality of regions during an unlocking process, and the verification input(s) from a user must be the same as the preset inputs (i.e., initial password(s)) that correspond(s) to the displayed at least one region and the display order of the displayed at least one region, so as to unlock the display panel.

That is, each of the preset pictures may include the plurality of regions, and when a certain preset picture is displayed and a certain region of the certain preset picture is identified, the unlocking of the display panel can be realized only by obtaining a preset input corresponding to the identified region of the certain preset picture.

As shown in FIG. 4, in the illustrated picture, the source driving area (e.g., a Source IC) range (i.e., the range in the horizontal direction) of the region where the "tiger" is located is Xm to Xn, the gate driving area (e.g., a Gate) range (i.e., the range in the vertical direction) is Ym to Yn, and a preset input corresponding to a region including these two ranges may be "a" or the like. When the display panel displays the region where the "tiger" of the picture shown in FIG. 4 is located, the display panel can be unlocked only in the case where the verification input from a user is "a".

In step S22, at least one unlocking process is performed, wherein each of the at least one unlocking process may include the following steps S221 to S223.

In step S221, when the display panel is in a locked state, the display panel is caused (e.g., driven) to display at least one preset picture and receive a verification input from a user.

That is, the user inputs the verification input according to the preset picture displayed by the display panel to achieve unlocking of the display panel.

As described above, for each preset picture, the TCON IC may represent and record the determination result as a logical value "1" in the memory when it is determined that the verification input is identical with the preset input corresponding to the displayed preset picture, and represent and record the determination result as a logical value "0" in the memory when it is determined that the verification input is not identical with the preset input corresponding to the displayed preset picture. For all of the displayed preset pictures, the verification inputs being identical with the preset inputs corresponding to the displayed preset pictures may mean that the TCON IC performs the AND operation on the determination results of all of the displayed preset pictures, and outputs a data enable signal (Data Enable) to switch the display panel to the unlocked state to display information desired by the user if a result of the AND operation is a logical value "1" (i.e., "OK" shown in FIG. 6). Further, in the case where the result of the AND operation is a logic value "0" (i.e., "NO" shown in FIG. 6), the display panel may be controlled to display a plurality of preset pictures to authenticate the user again, and/or may be controlled to remain in the locked state.

Specifically, when the display panel is in a locked state, the display panel is caused to display at least one preset picture and receive a verification input from a user (i.e., Step S221) may include: causing the display panel to sequentially display at least a part of preset pictures among the plurality of preset pictures and sequentially receive a plurality of verification inputs from the user.

In step S222, it is determined whether the verification inputs are identical with the preset inputs corresponding to the displayed preset pictures.

Specifically, the determining whether the verification inputs are identical with the preset inputs corresponding to the displayed preset pictures (i.e., step S222) may include: determining whether the verification inputs are identical with the preset inputs corresponding to the displayed preset pictures according to a display order of the displayed preset pictures, for example, by comparing the verification inputs with the preset inputs.

In step S223, the display panel is switched to the unlocked state, if the verification inputs are identical with the preset inputs corresponding to the displayed preset pictures.

That is, the displayed preset pictures have a certain display order, and the received preset inputs must correspond to the display order to unlock the display panel.

In an embodiment, the entire process of steps S221 to S223 may be implemented by the following steps S231 to S237.

In step S231, the display panel is caused to display a first picture, wherein the first picture is a picture of the preset pictures.

In step S232, a first verification input from the user is received.

In step S233, it is determined whether the first verification input is identical with the preset input corresponding to the first picture. For example, whether the first verification input is identical with the preset input corresponding to the first picture may be determined by comparing the first verification input with the preset input corresponding to the first picture.

In step S234, after determining whether the first verification input is identical with the preset input corresponding to the first picture (i.e., step S233), the display panel is caused to display a second picture, wherein the second picture is a picture of the preset pictures. For example, the TCON IC may record a logical value "1" indicating the determination result in the memory when the first verification input is identical with the preset input corresponding to the first picture, and may record a logical value "0" indicating the determination result in the memory when the first verification input is not identical with the preset input corresponding to the first picture, so as to subsequently perform the logical AND operation.

In step S235, a second verification input from the user is received.

In step S236, it is determined whether the second verification input is identical with the preset input corresponding to the second picture. For example, the TCON IC may record a logical value "1" indicating the determination result in the memory when the second verification input is identical with the preset input corresponding to the second picture, and may record a logical value "0" indicating the determination result in the memory when the second verification input is not identical with the preset input corresponding to the second picture, so as to subsequently perform the logical AND operation.

In step S237, if the first verification input is identical with the preset input corresponding to the first picture and the second verification input is identical with the preset input corresponding to the second picture, the display panel is switched to the unlocked state. If the first verification input is not identical with the preset input corresponding to the first picture and/or if the second verification input is not identical with the preset input corresponding to the second picture, the process may return to step S21 to re-perform the method for unlocking the display panel or to maintain the display panel in the locked state.

It should be noted that, although the above unlocking process only refers to the first picture and the second picture, but an unlocking process according to the present disclosure may display more pictures, for example, may further display a third picture, a fourth picture, etc., and the process thereof is similar to the above description, such that the detailed description thereof is omitted here.

For example, six monochromatic pictures of red, green, blue, purple, white, and yellow may be selected as the plurality of preset pictures (which may be referred to as aging pictures). In addition, the preset inputs corresponding to the six preset pictures may be as follow: "1" corresponds to the red preset picture, "23" corresponds to the green preset picture, a skip password (i.e., an empty password, or no initial password is set for the blue preset picture) corresponds to the blue preset picture, "456" corresponds to the purple preset picture, "7" corresponds to the white preset picture, and "8" corresponds to the yellow preset picture, as shown in FIG. 7. At time $T_A$, the display panel sequentially displays the plurality of preset pictures in the order of the red preset picture, the green preset picture, the blue preset picture, the purple preset picture, the white preset picture, and the yellow preset picture during an unlocking process, and in this case, the display panel is switched to the unlocked state when verification inputs are "12345678", as shown in FIG. 7. At time $T_D$, the display panel sequentially displays the plurality of preset pictures in the order of the white preset picture, the yellow preset picture, the red preset picture, the green preset picture, the blue preset picture, and the purple preset picture during another unlocking process, and in this case, the display panel is switched to the unlocked state when verification inputs are "78123456", as shown in FIG. 8. In this way, in the case of setting a fixed preset input (i.e., a fixed initial password), it is possible to make the unlocking of the display panel require a dynamic password, thereby improving the security of the locking.

In addition, in a case where a plurality of preset pictures (e.g., the red preset picture, the green preset picture, the blue preset picture, the purple preset picture, the white preset picture, and the yellow preset picture) are acquired, the display panel may display at least one of the plurality of preset pictures during each unlocking process. For example, as shown in FIG. 9, the TCON IC (e.g., the aging controller thereof) may execute a skip picture algorithm, such that displaying of the display panel skips the green preset picture and the white preset picture in the displaying of the red preset picture→the green preset picture→the blue preset picture→the purple preset picture→the white preset picture-→the yellow preset picture as shown in FIG. 7, and is as follows: the red preset picture 4 the blue preset picture→the purple preset picture→the yellow preset picture. In this case, the display panel can be unlocked only when verification inputs from the user during an unlocking process are "14568".

Further, a verification input provided by a user during an unlocking process is not limited to a character, but may be an action. For example, three monochromatic pictures of red, green, and blue may be selected as the plurality of preset pictures (which may be referred to as aging pictures), and the display panel sequentially displays the three pictures according to the above listed order of the three pictures in an unlocking process. Further, the preset inputs corresponding to the pictures may be as follows: a first action corresponds to the red preset picture, a second action corresponds to the green preset picture, and a third action corresponds to the blue preset picture. In this case, when verification inputs are the first action, the second action and the third action in sequence, the display panel is switched to an unlocked state.

In an embodiment, performing at least one unlocking process includes: performing a plurality of unlocking processes, and causing the display panel to display a same part of the preset pictures among the plurality of preset pictures and display the same part of the preset pictures in a same order in different unlocking processes.

That is, the same part of the preset pictures is displayed and the same part of the preset pictures is displayed in the same order in each unlocking process. Thus, the method for unlocking a display panel according to the present embodiment may realize unlocking of the display panel by using a fixed password (this method may be referred to as a power-on fixed repeated unlocking manner). For example, the displayed preset pictures and a display order of the displayed preset pictures in each unlocking process may be as shown in FIG. 7.

In an embodiment, performing at least one unlocking process includes: performing a plurality of unlocking processes, causing the display panel to display different parts of preset pictures among the plurality of preset pictures and/or display orders of the displayed preset pictures are different from each other in different unlocking processes. For example, a same part of preset pictures may be displayed in two adjacent unlocking processes, but the display orders of the same part of preset pictures in the two adjacent unlocking processes are different from each other, as shown in FIGS. 7 and 8. Further, in a previous unlocking process, the displayed preset pictures and a display order of the displayed preset pictures may be as shown in FIG. 7, and in the next unlocking process, the displayed preset pictures and a display order of the displayed preset pictures may be as shown in FIG. 9. In this case, both the parts of preset pictures displayed by the display panel and the display orders of the displayed preset pictures in adjacent two unlocking processes are different from each other.

That is, the preset pictures displayed in each unlocking process may be various, and the displayed preset pictures in each unlocking process may be selected randomly, thereby implementing an operation mode in which the display panel is locked by using a fixed password but unlocked by using a dynamic password (this mode may be referred to as a power-on randomly unlocking mode), and improving the security of locking the display panel.

In an embodiment, acquiring a plurality of preset pictures includes: acquiring the plurality of preset pictures arranged in a preset order; and performing at least one unlocking process includes: performing a plurality of unlocking processes, wherein in different unlocking processes, a start preset picture displayed in the current unlocking process is immediately after an end preset picture displayed in a previous unlocking process.

Figure 10:
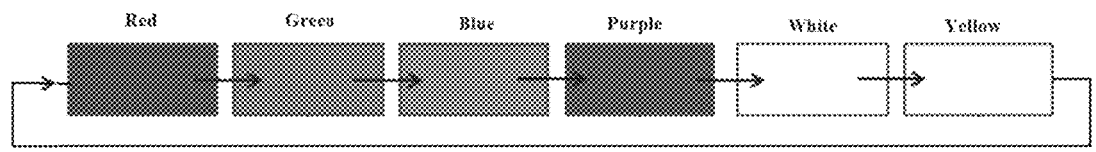
FIG. 10 is a schematic diagram of arranging a plurality of preset pictures into a closed loop according to a preset order (i.e., the listed order of the plurality of preset pictures), according to an embodiment of the present disclosure.

For example, if the plurality of preset pictures includes a first picture, a second picture, a third picture, a fourth picture and a fifth picture, and the five pictures are displayed in the above listed order thereof. In a first unlocking process, the displayed preset pictures may be the first picture, the second picture and the third picture in sequence; and in a second unlocking process, the displayed preset pictures may be the fourth picture, the fifth picture and the first picture in sequence (the mode may be referred to as a time accumulation unlocking mode). In other words, the time accumulation unlocking mode means that, the plurality of preset pictures include N1 (N1 may be greater than or equal to 2) pictures and are arranged according to a preset order into a closed loop (as shown in FIG. 10), the display panel displays N2 pictures in each unlocking process, where N2 may be greater than or equal to 1 and less than N1, and the start preset picture displayed in the current unlocking process is adjacent to the end preset picture displayed in the immediately previous unlocking process in the clockwise direction or in the counterclockwise direction on the closed loop.

In the method for unlocking a display panel according to the present embodiment, a plurality of preset pictures may be provided, and different preset pictures correspond to different preset inputs, such that displaying of different preset pictures requires different verification inputs to unlock the display panel, and thus a dynamic password (i.e., a non-fixed password) is needed for unlocking the display panel. Even if the preset input corresponding to each preset picture or a verification input in the current unlocking process may be acquired through the input trace of a background program or through other methods, a verification input during a next unlocking process cannot be acquired because the preset pictures to be displayed and the display order of the displayed preset pictures are unknown in the next unlocking process, thereby realizing the safe dynamic unlocking of the display panel. Compared with the unlocking of the display panel by using a fixed password in the prior art, the encryption (or locked) safety of the display panel can be improved, such that illegal unlocking of the display panel by using input traces of a background program or other methods can be avoided.

In addition, the method for unlocking a display panel may be performed by the TCON IC in a display assembly, thereby achieving unlocking of the display panel at a display level (e.g., in FIG. 5, the method for unlocking the display panel may be independent of a system on chip (SOC) or a host), and no information needs to be stored at a system end.

Thus, the method for unlocking a display panel may be physically isolated from the system end, and thus has a high security.

It should be noted that, the method for unlocking a display panel according to the present embodiment may be applied to unlock a display panel of a mobile terminal (e.g., a mobile phone, a computer, etc.), and may also be applied to other devices with a display function or a picture control function (e.g., an intelligent door lock, an entrance control device, or an access right management device, etc.). That is, other application devices may adopt the method for unlocking a display panel in a display assembly thereof according to the above-described principle as long as the other application devices are involved in a display process. In this way, display-level authentication may be incorporated into an unlocking process of a device. Further, a system (host) controlling the device may further include system-level authentication, so as to verify the correctness of the multiple levels of password.

Figure 1:
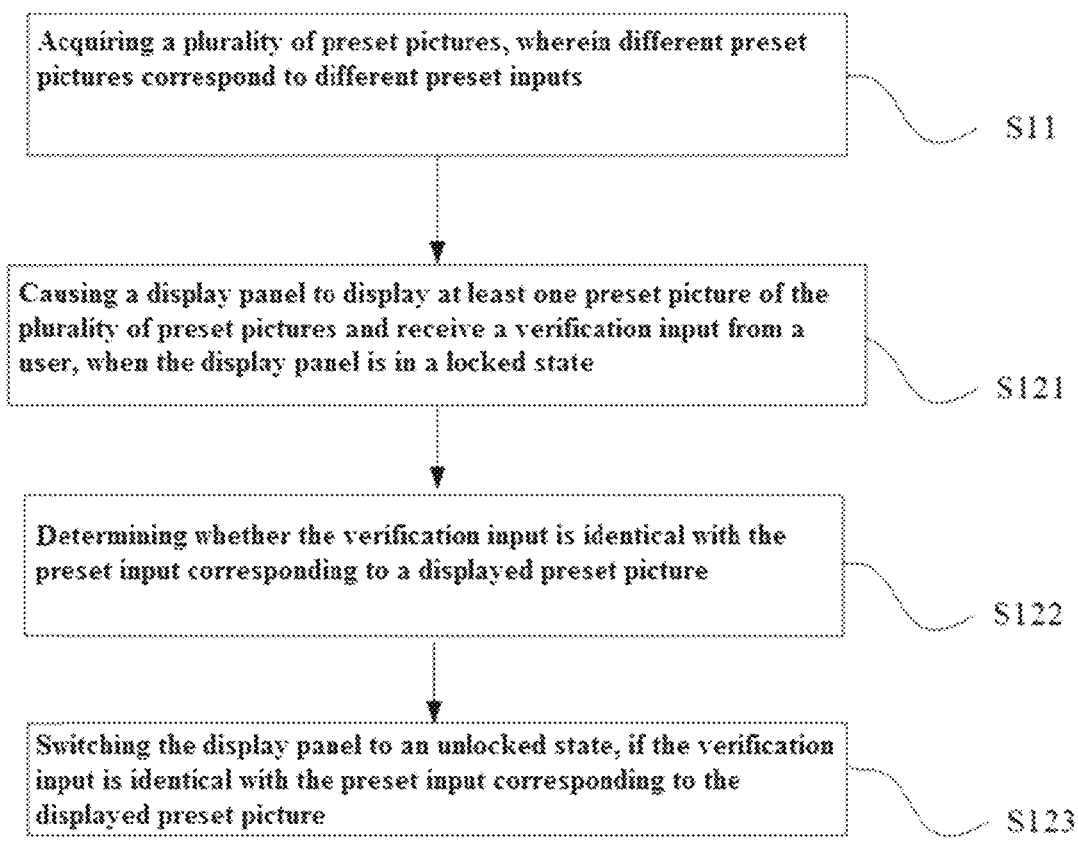
FIG. 1 is a schematic flowchart of a method for unlocking a display panel according to an embodiment of the present disclosure.
Figure 2:
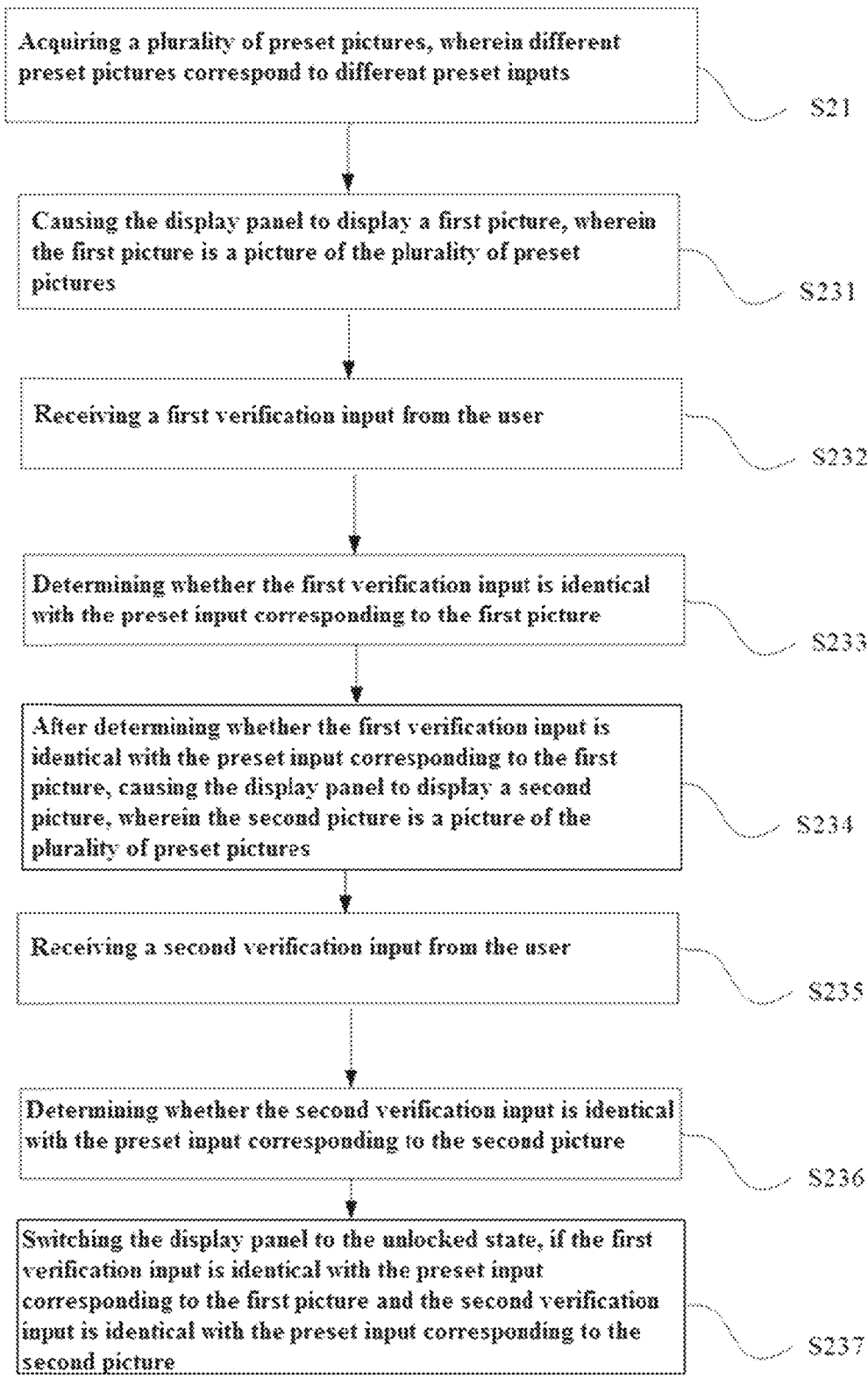
FIG. 2 is a schematic flowchart of a method for unlocking a display panel according to an embodiment of the present disclosure.
Figure 3:
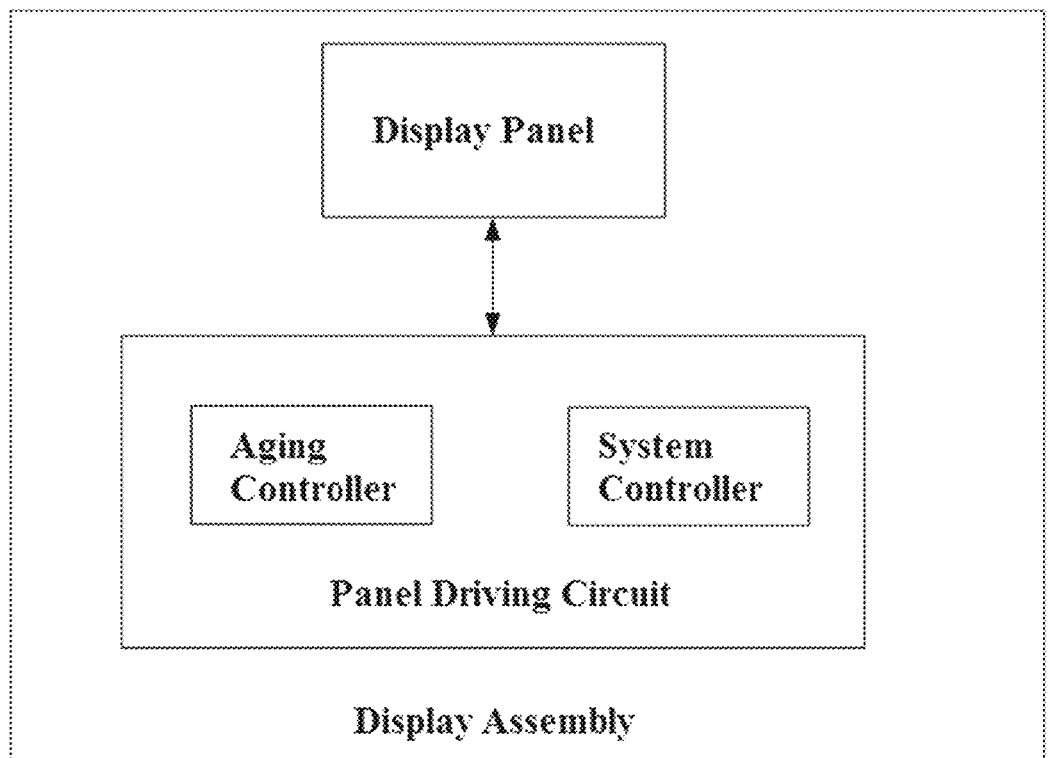
FIG. 3 is a schematic diagram showing a structure of a display assembly according to an embodiment of the present disclosure.

As shown in FIGS. 1 to 4, embodiments of the present disclosure further provide a display assembly that includes a display panel, and an unlocking unit for unlocking the display panel by the method for unlocking a display panel according to the embodiment shown in FIG. 1 or 2.

For example, the unlocking unit may be the panel driving circuit (i.e., the TCON IC), and the TCON IC includes the aging controller and the system controller. Acquiring a plurality of preset pictures may mean storing the plurality of preset pictures in the aging controller of the TCON IC in advance, wherein each of the plurality of preset pictures has a corresponding preset input, so as to implement an unlocking process subsequently.

In an embodiment, the display panel is a touch display panel.

That is, the unlocking unit may receive a verification input from a user through the user touching the display panel.

The display assembly according to the present embodiment of the present disclosure has improved encryption (or locked) safety, such that illegal unlocking of the display panel of the display assembly by using input traces of a background program or other methods can be avoided.

For example, the display panel may be any product or component having a display function, such as a liquid crystal display panel, an organic light emitting diode (OLED) display panel, electronic paper, a mobile phone, a tablet computer, a television, a notebook computer, a digital photo frame, a navigator, or the like.

In an embodiment, the method for unlocking a display panel according to any one of the foregoing embodiments of the present disclosure may be implemented by a computer program, and the computer program may be stored in a memory of the display panel (e.g., in the TCON of the display panel, and more particularly, in the TCON IC of the TCON of the display panel) in the form of software or firmware. In a case where the display panel is in a locked state and a user triggers an unlocking process, the TCON (e.g. the TCON IC of the TCON) of the display panel or a microprocessor or an application specific integrated circuit (ASIC) with corresponding functions included in the display panel may read and execute the computer program, thereby implementing the method for unlocking a display panel. In an embodiment, the unlocking unit according to any one of the foregoing embodiments of the present disclosure may be the panel driving circuit (i.e., the TCON IC), or may be the microprocessor or the application specific integrated circuit (ASIC) having corresponding functions included in the display panel.

It should be noted that, in the present disclosure, relational terms such as first, second, and the like are used solely for distinguishing one entity or action from another entity or action, without necessarily requiring or implying any actual relationship or order between such entities or actions. Further, each of the terms "comprises", "include", or any other variation thereof, are intended to cover a non-exclusive inclusion, such that a process, method, article, or apparatus that includes a list of elements does not include only those elements but may further include other elements not expressly listed or inherent to such a process, method, article, or apparatus. Without further limitation, an element following the phrase "including an . . . " does not exclude the presence of other identical elements in the process, method, article, or apparatus that includes the element.

Some exemplary embodiments in accordance with the present disclosure have been described above, but these embodiments are not exhaustive of all details, nor are they limiting the present disclosure to the embodiments as described. Apparently, many modifications and variations are possible in light of the above description. The foregoing embodiments were chosen and described to best explain the principles and the practical application of the present disclosure, thereby enabling one of ordinary skill in the art to best utilize the present disclosure and make various modifications to the described embodiments. The scope of the present disclosure is limited only by the appended claims and their equivalents.

What is claimed is:

1. A method for unlocking a display panel, the method being executed by an unlocking unit that is for controlling a display function of the display panel, to achieve unlocking of the display panel at a display level, the method comprising:

acquiring a plurality of preset pictures, wherein different preset pictures among the plurality of preset pictures correspond to different preset inputs, and the plurality of preset pictures are stored in an aging controller of the unlocking unit in advance;

performing at least one unlocking process, wherein each of the at least one unlocking process comprises:

causing the display panel to display at least one preset picture of the plurality of preset pictures and receive a verification input from a user, when the display panel is in a locked state;

determining whether the verification input is identical with the preset input corresponding to a displayed preset picture; and switching the display panel to an unlocked state, if the verification input is identical with the preset input corresponding to the displayed preset picture, wherein in a case of causing the display panel to display two or more preset pictures of the plurality of preset pictures, the determining whether the verification input is identical with the preset input corresponding to a displayed preset picture comprises:

performing, by a system controller, an operation on determination results of displayed preset pictures and respective verification inputs, and wherein both the system controller and the aging controller are included in the unlocking unit.

2. The method according to claim 1, wherein the causing the display panel to display at least one preset picture of the plurality of preset pictures and receive the verification input from the user, when the display panel is in a locked state comprises: causing the display panel to sequentially display at least one part of the preset pictures among the plurality of preset pictures, and sequentially receive verification inputs from the user, wherein the verification inputs are in one-to-one correspondence with the at least one part of the preset pictures; and the determining whether the verification input is identical with the preset input corresponding to a displayed preset picture comprises: determining whether the verification inputs are identical with the preset inputs corresponding to the at least one part of the preset picture according to a display order of the at least one part of the preset picture.

3. The method according to claim 2, wherein the causing the display panel to display at least one preset picture of the plurality of preset pictures and receive the verification input from the user, when the display panel is in a locked state, and the determining whether the verification input is identical with the preset input corresponding to a displayed preset picture comprise:

causing the display panel to display a first picture, wherein the first picture is a picture of the plurality of preset pictures;

receiving a first verification input from the user;

determining whether the first verification input is identical with the preset input corresponding to the first picture;

after determining whether the first verification input is identical with the preset input corresponding to the first picture, causing the display panel to display a second picture, wherein the second picture is a picture of the plurality of preset pictures;

receiving a second verification input from the user;

determining whether the second verification input is identical with the preset input corresponding to the second picture; and switching the display panel to the unlocked state, if the first verification input is identical with the preset input corresponding to the first picture and the second verification input is identical with the preset input corresponding to the second picture.

4. The method according to claim 3, wherein the second picture is different from the first picture.

5. The method according to claim 1, wherein the performing at least one unlocking process comprises:

performing a plurality of unlocking processes, and in different unlocking processes among the plurality of unlocking processes, causing the display panel to display at least two preset pictures among the plurality of preset pictures and display the at least two preset pictures in a same order.

6. The method according to claim 1, wherein the performing at least one unlocking process comprises:

performing a plurality of unlocking processes, and in different unlocking processes among the plurality of unlocking processes, causing the display panel to display different parts of preset pictures among the plurality of preset pictures, or display a same part of preset pictures among the plurality of preset pictures in different orders.

7. The method according to claim 6, wherein the acquiring a plurality of preset pictures comprises: arranging the plurality of preset pictures into a closed loop according to a preset order; and in different unlocking processes among the plurality of unlocking processes, a start preset picture displayed in a current unlocking process is adjacent, in a clockwise direction or a counterclockwise direction of the closed loop, to an end preset picture displayed in an immediately previous unlocking process.

8. The method according to claim 1, wherein the acquiring a plurality of preset pictures, wherein different preset pictures among the plurality of preset pictures correspond to different preset inputs comprises:

each of the plurality of preset pictures corresponding to one preset input.

9. The method according to claim 1, wherein each of the preset inputs is an initial password for locking the display panel, and the initial password comprises any one of a character, an action, and an empty password.

10. The method according to claim 1, wherein the acquiring a plurality of preset pictures, wherein different preset pictures among the plurality of preset pictures correspond to different preset inputs comprises:

each of the plurality of preset pictures comprising a plurality of regions, and different regions among the plurality of regions corresponding to different preset inputs, respectively.

11. A display assembly, comprising:

a display panel; and an unlocking unit configured to perform the following operations:

acquiring a plurality of preset pictures, wherein different preset pictures among the plurality of preset pictures correspond to different preset inputs, and the plurality of preset pictures are stored in an aging controller of the unlocking unit in advance, to achieve unlocking of the display panel at a display level;

performing at least one unlocking process, wherein each of the at least one unlocking process comprises:

causing the display panel to display at least one preset picture of the plurality of preset pictures and receive a verification input from a user, when the display panel is in a locked state;

determining whether the verification input is identical with the preset input corresponding to a displayed preset picture; and switching the display panel to an unlocked state, if the verification input is identical with the preset input corresponding to the displayed preset picture, wherein in a case of causing the display panel to display two or more preset pictures of the plurality of preset pictures, the determining whether the verification input is identical with the preset input corresponding to a displayed preset picture comprises:

performing, by a system controller, an operation on determination results of displayed preset pictures and respective verification inputs, and wherein both the system controller and the aging controller are included in the unlocking unit.

12. The display assembly according to claim 11, wherein the unlocking unit is further configured to perform the following operations:

causing the display panel to sequentially display at least one part of the preset pictures among the plurality of preset pictures, and sequentially receive verification inputs from the user, wherein the verification inputs are in one-to-one correspondence with the at least one part of the preset pictures; and determining whether the verification inputs are identical with the preset inputs corresponding to the at least one part of the preset picture according to a display order of the at least one part of the preset picture.

13. The display assembly according to claim 12, wherein the unlocking unit is further configured to perform the following operations:
    causing the display panel to display a first picture, wherein the first picture is a picture of the plurality of preset pictures;
    receiving a first verification input from the user;
    determining whether the first verification input is identical with the preset input corresponding to the first picture;
    after determining whether the first verification input is identical with the preset input corresponding to the first picture, causing the display panel to display a second picture, wherein the second picture is a picture of the plurality of preset pictures;
    receiving a second verification input from the user;
    determining whether the second verification input is identical with the preset input corresponding to the second picture; and
    switching the display panel to the unlocked state, if the first verification input is identical with the preset input corresponding to the first picture and the second verification input is identical with the preset input corresponding to the second picture.

14. The display assembly according to claim 11, wherein the unlocking unit is further configured to perform the following operations:
    performing a plurality of unlocking processes, and in different unlocking processes among the plurality of unlocking processes, causing the display panel to display at least two preset pictures among the plurality of preset pictures and display the at least two preset pictures in a same order.

15. The display assembly according to claim 11, wherein the unlocking unit is further configured to perform the following operations:
    performing a plurality of unlocking processes, and in different unlocking processes among the plurality of unlocking processes, causing the display panel to display different parts of preset pictures among the plurality of preset pictures, or display a same part of preset pictures among the plurality of preset pictures in different orders.

16. The display assembly according to claim 15, wherein the unlocking unit is further configured to perform the following operations:
    arranging the plurality of preset pictures into a closed loop according to a preset order; and
    in different unlocking processes among the plurality of unlocking processes, determining a start preset picture displayed in a current unlocking process to be adjacent, in a clockwise direction or a counterclockwise direction of the closed loop, to an end preset picture displayed in an immediately previous unlocking process.

17. The display assembly according to claim 11, wherein the unlocking unit is further configured to perform the following operation:
    setting one preset input for each of the plurality of preset pictures.

18. The display assembly according to claim 11, wherein the unlocking unit is further configured to perform the following operations:
    setting each of the preset inputs as an initial password for locking the display panel, and setting the initial password to comprise any one of a character, an action, and an empty password.

19. The display assembly according to claim 11, wherein the display panel is a touch display panel.

20. The display assembly according to claim 11, wherein the unlocking unit is further configured to perform the following operation:
    in a case where each of the plurality of preset pictures comprises a plurality of regions, setting different preset inputs for different regions among the plurality of regions, respectively.

\* \* \* \* \*